Nov. 29, 1949 P. J. SCHLUDE 2,489,504
CHEESE CUTTING MACHINE
Filed May 16, 1947 4 Sheets-Sheet 2
Fig. 3.
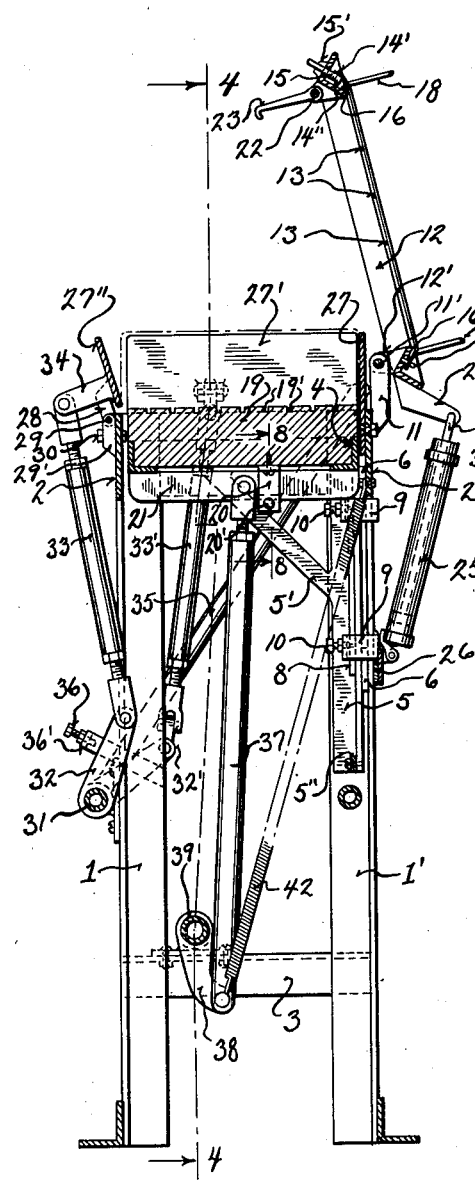
Fig. 4.
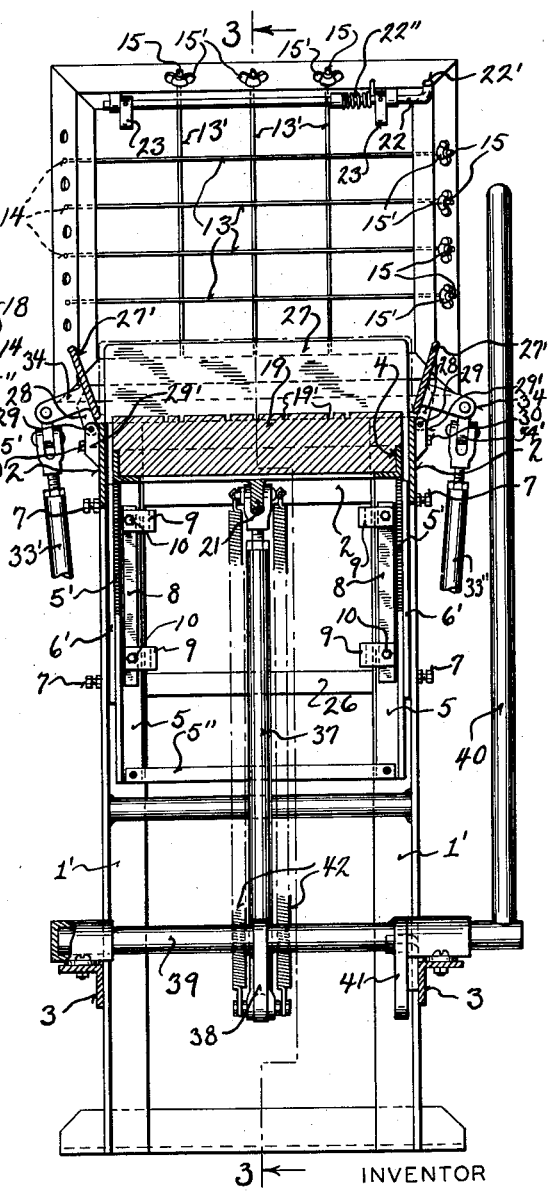
INVENTOR
PHILIP J. SCHLUDE
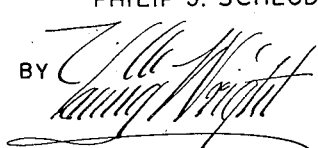
ATTORNEYS Nov. 29, 1949 — P. J. SCHLUDE — 2,489,504
CHEESE CUTTING MACHINE
Filed May 16, 1947 — 4 Sheets-Sheet 3
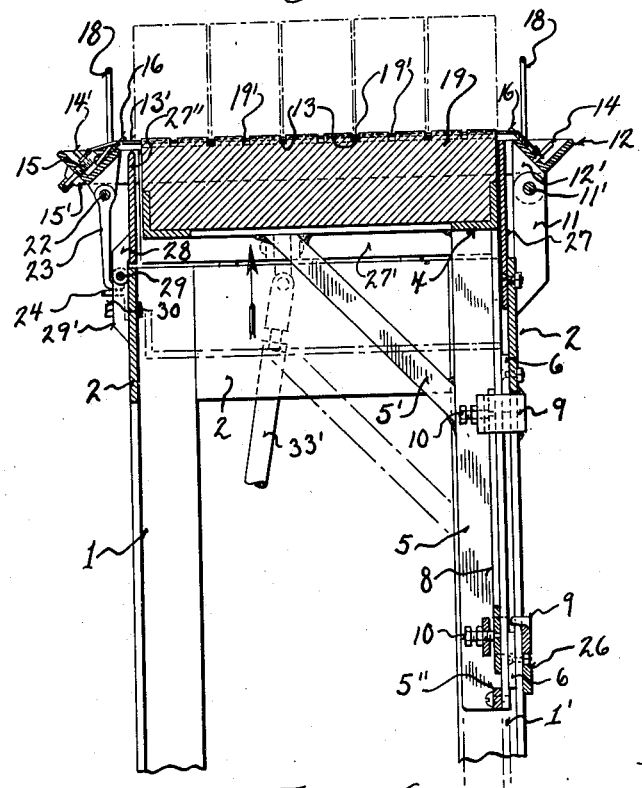
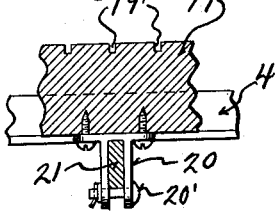
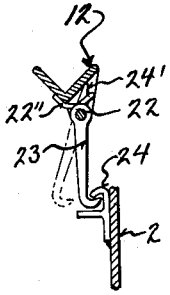
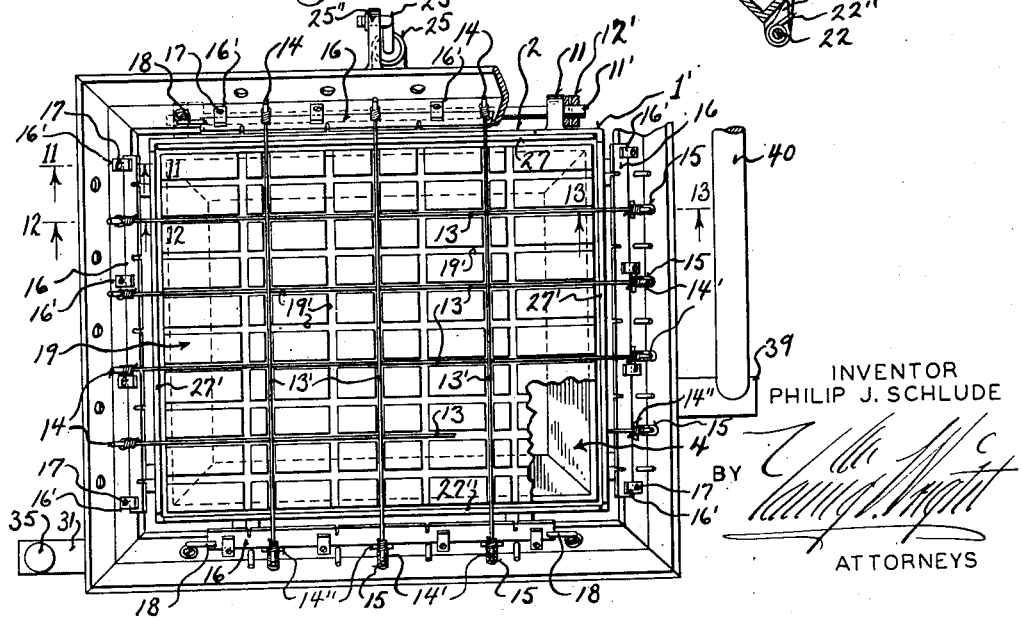
INVENTOR
PHILIP J. SCHLUDE
BY
ATTORNEYS Nov. 29, 1949     P. J. SCHLUDE     2,489,504
CHEESE CUTTING MACHINE
Filed May 16, 1947     4 Sheets-Sheet 4
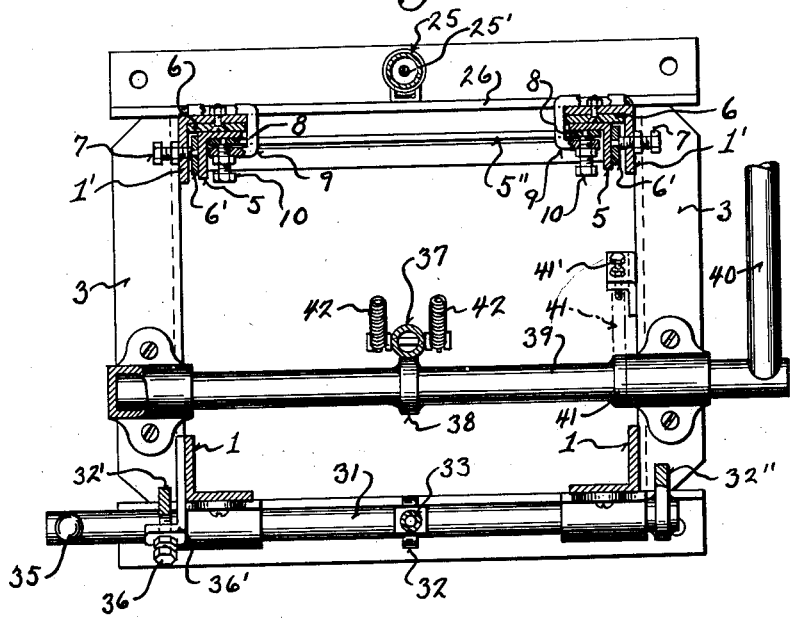
Fig. 7.
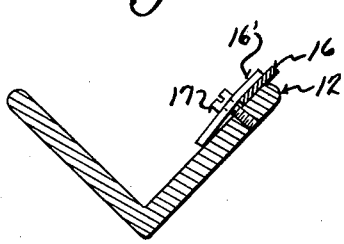
Fig. 11.
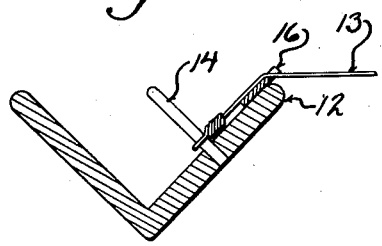
Fig. 12.
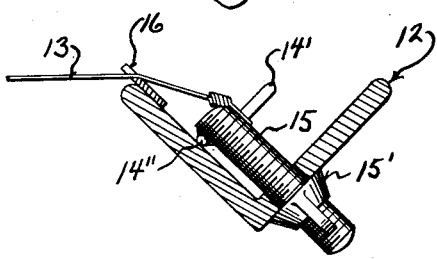
Fig. 13.
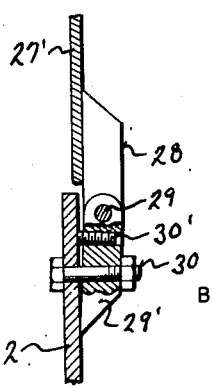
Fig. 14.
INVENTOR
PHILIP J. SCHLUDE
BY
ATTORNEYS Patented Nov. 29, 1949

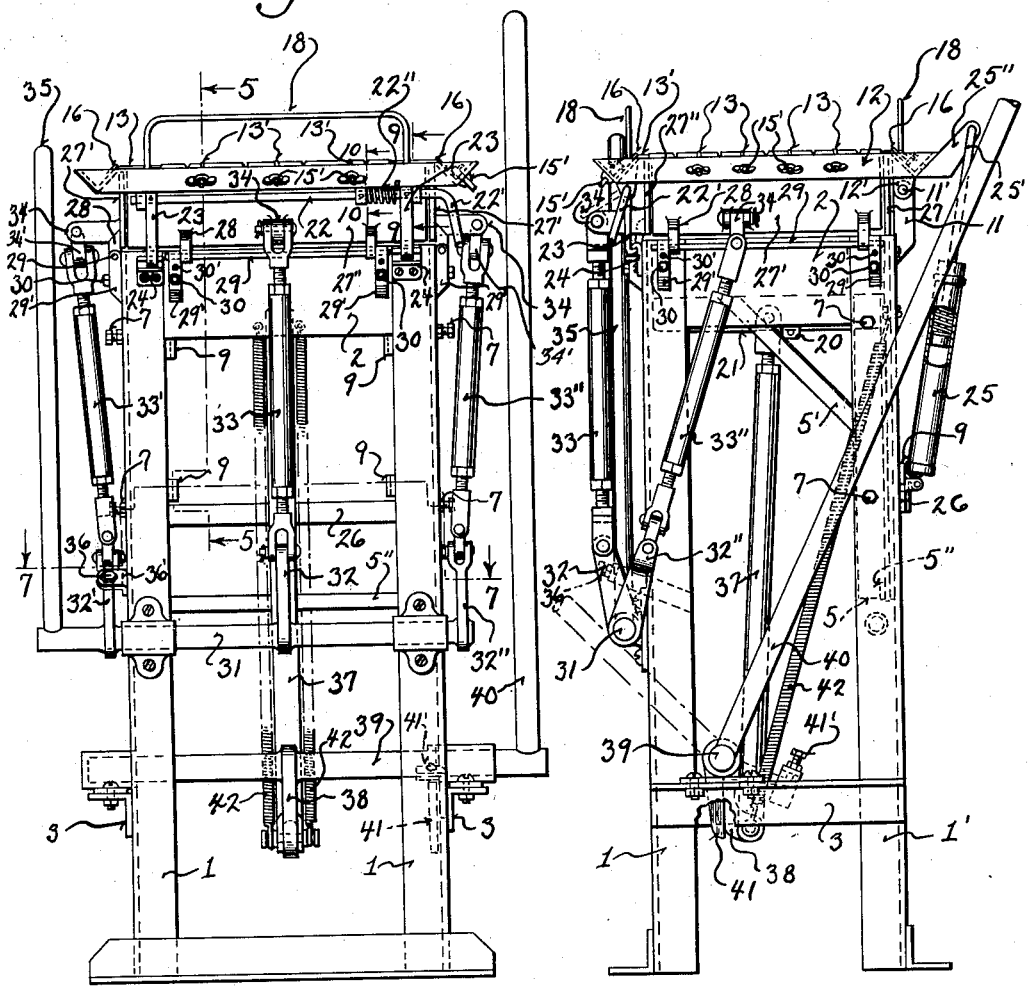

2,489,504

UNITED STATES PATENT OFFICE 2,489,504

CHEESE CUTTING MACHINE

Philip J. Schlude, Kaukauna, Wis., assignor, by mesne assignments, to Essential Products Corporation, Little Chute, Wis.

Application May 16, 1947, Serial No. 748,499

1 Claim. (Cl. 31—26)

My invention refers to cheese cutting machines, and it has for its primary object to provide a simple and effective machine, having a body and a skeleton frame carrying cutting wires or knives mounted therein. This cutting head is associated with a reciprocative cheese supporting table, whereby a bulk or loaf cheese is severed into marketable bricks for the retail trade. It is emphasized that the machine body carries adjustable wings forming a tunnel, the side walls of which wings engage and guide the cheese as it is forced through the cutter head to sever the same into pre-determined small rectangular units.

Practice has demonstrated that a bulk cheese of the rindless variety, under various temperature conditions or even under its own weight, will bulge at its side faces. With this condition in mind, applicant provides means for compressing the bulged sides of the cheese, whereby it is molded in proper alignment to insure cutting the same into bricks of equal or unequal area.

A further object of my invention is to provide adjusting means for accurately aligning the cutting head, winged trough and table, whereby the same in their reciprocative relations will accurately separate the cheese into pre-determined small units.

A further object of my invention is to provide a cutter head in swinging connection with a body and with wings in pivotal connection therewith and a reciprocative table normally positioned under the wings, the said table and wings being in toggle links and lever connection, whereby movement is imparted thereto.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 1 is a front elevation of a machine embodying the features of my invention.

Figure 2 is a side elevation of the same.

Figure 3 is a longitudinal, sectional view of the machine, positioned to receive a cheese, the section being indicated by line 3—3 of Figure 4.

Figure 4 is a front sectional elevation of the machine, the section being indicated by line 4—4 of Figure 3.

Figure 5 is a fragmental sectional side elevation of the machine, the section being indicated by line 5—5 of Figure 1.

Figure 6 is a plan view of the machine with parts broken away and in section to more clearly illustrate structural features.

Figure 7 is a plan sectional view through the machine, the section being indicated by line 7—7 of Figure 1.

Figure 8 is a detailed sectional view through the cheese block and its means of attachment to the table frame, the section being indicated by line 8—8 of Figure 3.

Figure 9 is a fragmentary detailed sectional view through the cutter head and the body illustrating the lock and release means for said cutter head, the section being indicated by line 9—9 of Figure 1.

Figure 10 is another sectional elevation through the cutter head, the section being indicated by line 10—10 of Figure 1.

Figures 11 to 13 inclusive are cross sectional views upon a magnified scale of the cutter frame and wire cutting connections thereto, the sections being indicated by lines 11—11, 12—12 and 13—13 of Figure 6.

Figure 14 is a detailed fragmental sectional view of the wing lug anchorage arrangement shown in Figure 2.

Referring by characters to the drawings, 1 and 1' indicate front and rear pairs of angle iron legs of a rectangular frame, which frame at its upper end is secured by guide plates 2 to form a portion of a funnel, the bottom ends of the legs being connected by angle iron straps 3—3, whereby the said body or the skeleton frame is rigidly braced in all directions.

Reciprocatively mounted in the body is a table comprising rectangular angle iron frame bed 4, which frame bed is secured to depending rearwardly positioned angle iron slide bars 5, the same having obliquely disposed supporting arms 5' which extend forwardly and are secured to the table frame bed 4.

The slide bars 5 are nested within the rear body legs 1' as best indicated in Figure 7 of the drawings and the ends of said bars are connected by a tie strip 5".

The slide bars 5 are engaged by antifriction straps 6 and 6', secured to the inner faces of the angle iron legs and the strip 6' is anchored by adjusting bolts 7.

The angle iron bars 5 are held in their sliding engagement with the strap 6 by antifriction rubbing plates 8, which rubbing plates are adjustably anchored to clips 9 carried by the body legs 1', the said rubbing plates being secured thereto by adjusting bolts 10.

Owing to the adjustable feature of the slide and rubbing plates, the same will resist wear due to the reciprocation of the table, and also said table may be finely aligned with reference to its proper reciprocation. It is also apparent that in order to avoid lateral twist strain upon the table, the rear legs are formed with pairs of clips 9, as best indicated in Figures 4, 5 and 6 of the drawings.

The rear frame plate 2 of the body has extending upwardly therefrom a pair of ears 11, carrying a pivot rod 11' and mounted upon said rod is a V-shaped angle iron cutter frame 12 and depending ears 12', which engage the rod.

The angle iron rectangular frame 12 may be termed "a cutter head" as best illustrated in Figures 4 to 6 and 11 to 13 inclusive. The inner face of the angle iron frame 12 carry two series of crossed wire cutting strands 13 and 13'. One end of these strands is anchored by a loop to pins 14 and the opposite ends are looped over pins 14' which extend from screw threaded tie bolts 15, the same being anchored in apertures of the outer web of said V-shaped angle iron frame 12, the said tie bolts 15 each having a transversely disposed shoe 14'' which engages the face of the inner web of said frame. The bolts are adjustably anchored by thumb nuts 15'.

The wire strands 13 and 13' are lined in parallel relations by notched blades 16, which blades are longitudinally adjustable and secured, by a plurality of ears 16' that frictionally engage the blades and are secured to the associated angle iron web, by screws 17.

From the foregoing anchorage of the wire strands, it will be noted that they may be adjusted to provide the required tension upon the wires, and furthermore, said wires, by this anchorage means, may be readily replaced for repair purposes.

It will also be noted that the angle iron stretches of the cutter head frame 12 are provided with other bolt apertures associated with pins 14, whereby the mesh of the wire cutting strands may be varied.

Thus, for example, as best indicated in Figures 4 and 6, the wire strands may be supplemented or varied for cutting oblong blocks of cheese, or square blocks thereof, and as a matter of fact, by suitable stringing of the wires, the blocks may be cut in various shapes to divide the cheese bulk into pre-determined brick sizes.

As best indicated in Figures 1 and 5 of the drawings, the cutter head frame 12, also has extending upwardly therefrom a pair of wire guide loops 18, which serve to confine small end cheese blocks against separating or dropping away from the cut piece, keeping in mind that under said conditions, there may be cut from the cheese small slices at the side walls of said cheese body.

The bed 4 of the reciprocated table is adapted to receive a removable cheese block 19 and as best shown in Figures 3 and 8 of the drawings, the block is anchored within the bed by an eared bracket 20 secured to the bottom face of the block. The ears of the bracket engage a centrally disposed brace bar 21 which extends from the back bed stretches 4 to the front bed stretch and is secured thereto. The block 19 is confined by a bolt 20' extending through the ears of the bracket and engaging the underface of the brace bar 21.

The front stretch of the angle iron frame 12 is pivoted by ears thereof to a rocking rod 22 having a handle 22' at one end. Extending downwardly therefrom is a pair of locking dogs 23, the nosed ends of which engage hooped lugs 24 carried by the upper ends of the front legs plates as best shown in Figures 1, 2, 5 and 9 of the drawings.

The rod 22 carries a coil spring 22'' which exerts pressure upon the locking dogs whereby they will automatically engage the hooped lugs 24 when the cutting head is swung downwardly upon its pivot to a functioning position, it being understood that the locking dogs 23 are held in a vertical position under spring pressure by spurs 24' extending from the face of the dogs and engaging the frame 12.

When the cutting head is in its locked functioning position and it is desired to release it, whereby it may be opened up for the purpose of inserting a bulk cheese upon the table block 19, it is only necessary to release the dogs 23 and the cutting head will rock to its open position as shown in Figures 3 and 4 of the drawings under spring tension.

The spring tension for lifting the cutter head embodies a cylinder 25 having its lower end in pivotal connection with a strap 26 which is secured to the rear legs of the body frame.

The cylinder 25 in effect comprises a dash pot of standard variety having a spring controlled piston rod 25' extending from its free end, and said piston rod is pivotally connected to a centrally disposed ear 25'' extending from the angle iron frame 12 as best indicated in Figures 2 and 3.

An important feature of my cutting machine is to provide a tunnel through which the cheese is pushed, the same being adjustable for more or less compression of said cheese.

The tunnel in this exemplification of my invention is provided with a rear fixed wing 27 which is secured to the rear frame plate 2.

The side wings 27' and the front wing 27'' have downwardly extended pairs of ears 28 which ears are pivoted to rods 29 that extend through adjustable lugs 29', the pivot connection being upon approximate alignment with the upper edges of the frame plates 4.

The lugs 29' as best shown in Figure 14 of the drawings are secured to the plates 4 by single bolts 30 and said lugs are provided with threaded openings above the bolts for the reception of set screws 30'.

By the above referred to anchorage arrangement of the lugs 29', the pivot rods 29 may be slightly adjusted in or out to insure compression and centering of the cheese body.

Power means for swinging the wings against the side walls of the cheese comprising a rocking shaft 31 suitably journaled in bearings carried by the front legs 1 and said shaft has extended upwardly therefrom three lever arms 32, 32' and 32''. Each of these arms are connected by adjustable link rods 33, 33' and 33'' to ears 34 extending outwardly from the wing plates.

To compensate for the twist motion between the rods 33' and 33'', I provide end toggle links 34' which complete the rod connections to the wing ears 34, which ears form a part of the companion pivoted ears positioned at a right angle to the fixed ear 27 and the pivoted ear 27''. The link rods 33' and 33'' only are connected to their associated wings 27' by the toggle links 34'. The rock shaft 31 has extending from one end thereof a hand lever 35.

Hence, by movement of the hand lever, the tunnel wings are folded inwardly or outwardly and the inward folding movement of said wings is limited by an adjustable stop bolt 36 which engages the lever arm 32', the said stop bolt being carried by an ear 36' extending outwardly from the left front body leg 1.

Reciprocating power is imparted to the cheese carrying table by an adjustable piston rod 37, the upper end of which is pivotally connected to the cheese table brace bar 21, and the lower end of said piston rod is pivotally connected to a centrally disposed crank arm 38 which crank arm is mounted upon a rock shaft 39 mounted in journals carried by the angle iron straps 3.

One end of the rock shaft 39 carries a hand lever 40 whereby a power is applied to raise and lower the cheese table.

Upward movement of the block 19 and cheese table is accurately limited by a finger 41 extending downwardly from the rock shaft 39 and said finger engages the end of a stop bolt 41' which is carried by a bracket extending inwardly from one of the angle iron body frame straps 3. It should be noted when the table and its associated block 19 rise to the limit of their movement, the said block will extend slightly above the wire stretches of the cutting head and to permit this movement, the upper face of the block 19 is provided with cross grooves 19' into which the cutting wires are imbedded at the finish of a cutting stroke. Thus insuring complete severing of the bulk cheese into bricks and as best indicated in Figure 6 of the drawings, there may be an idle series of these grooves, whereby the block may be used when the cutting head wires are adjusted for varying the cut of the bricks.

For the purpose of counter balancing the weight of the table and associated cheese, as indicated in dotted lines Figure 5, I provide a pair of coil springs 42, which springs are connected to the crank arm 38 and the rear plate 4 of the body frame. By this arrangement the lifting power for cutting the cheese into bricks is reduced to a minimum.

Briefly, as noted in Figures 3 and 4 of the drawings, the cutting head being open and the wings flared outwardly, the cheese will readily drop into place and prior to the table being moved upwardly, the wings will rock upon their pivots to assume a parallel squeezing position or an inwardly inclined position at their mouth end. Hence, when the cheese is pushed upwardly, it is contracted as it is discharged through the inwardly inclined mouth of the funnel.

From the foregoing description the operation of the machine is apparent. For example when the parts are in the position illustrated in Figure 3 of the drawings the machine is open to receive a bulk cheese and as indicated in dotted lines in said Figure 3 when the cheese is placed upon the face of the block 19, the cutting head is swung downwardly and locked just above the upper edges of the compression tunnel wing. The table is then moved upwardly by its power connections, whereby the cheese is severed into its pre-determined number of bricks as indicated in Figure 5 of the drawings, it being kept in mind that the tunnel wings are constantly pressing against the side walls of the cheese in its upward movement, whereby any bulge in said side walls is eliminated.

I claim:

A cheese cutting machine comprising a skeleton frame having two pairs of parallel guide plates secured to its upper end, the same together forming a rectangular housing, a fixed wing secured to one of the guide plates, a companion wing pivoted to the opposite parallel guide plate, and a companion pair of parallel wings pivoted to the other pair of guide plates forming a rectangular funnel in conjunction with said guide plates, a reciprocative frame bed nested within the winged guide plate funnel, a cheese block carried by the frame bed, a shiftable cheese cutting head carried by the said skeleton frame, means for aligning the cheese cutting head with the funnel wings, a rock shaft journaled upon the frame in parallel alignment with the fixed wing and its companion pivoted wing, lever arms carried by the ends of the rock shaft, and a lever arm carried by said rock shaft intermediate its ends, a link rod connecting said intermediate lever arm and pivoted companion wing, and a pair of link rods connecting the lever arms carried at the ends of the rock shaft with the companion pair of pivoted wings.

PHILIP J. SCHLUDE.

REFERENCES CITED

The following references are of record in the file of this patent:

UNITED STATES PATENTS

| Number | Name | Date |
| --- | --- | --- |
| 1,122,960 | Longfellow et al. | Dec. 29, 1914 |
| 1,145,557 | Cole | July 6, 1915 |
| 1,177,900 | Scanlan | Apr. 4, 1916 |
| 1,595,120 | Peterson | Aug. 10, 1926 |

FOREIGN PATENTS

| Number | Country | Date |
| --- | --- | --- |
| 15,115 | Great Britain | July 7, 1902 |